United States Patent
Khamesra et al.

(10) Patent No.: US 12,119,755 B2
(45) Date of Patent: Oct. 15, 2024

(54) SYNCHRONOUS RECTIFIER SCHEME FOR CONTINUOUS CONDUCTION MODE IN PRIMARY SIDE CONTROLLED FLY-BACK CONVERTER

(71) Applicant: Cypress Semiconductor Corporation, San Jose, CA (US)

(72) Inventors: Arun Khamesra, Bangalore (IN); Pragyan S. Biswal, Odisha (IN); Hariom Rai, Bangalore (IN); Saravanan Murugesan, Bangalore (IN)

(73) Assignee: Cypress Semiconductor Corporation, San Jose, CA (US)

( * ) Notice: Subject to any disclaimer, the term of this patent is extended or adjusted under 35 U.S.C. 154(b) by 201 days.

(21) Appl. No.: 17/829,130

(22) Filed: May 31, 2022

(65) Prior Publication Data

US 2023/0387818 A1 Nov. 30, 2023

(51) Int. Cl.
  *H02M 3/335* (2006.01)

(52) U.S. Cl.
  CPC .............................. *H02M 3/33592* (2013.01)

(58) Field of Classification Search
  CPC ............ H02M 3/22; H02M 1/08; H02M 1/36; H02M 3/24; H02M 3/325; H02M 3/335; H02M 3/28; H02M 3/01; H02M 3/33569; H02M 3/33507; H02M 2007/4815; H02M 2007/4818; H02M 1/083; H02M 3/33538; H02M 3/33546; H02M 3/33515; H02M 3/33576; H02M 3/33592; H02M 3/33553; H02M 3/33523; H02M 3/33561; H02M 3/155; H02M 3/1582; H02M 1/4233; H02M 1/12; H02M 3/07; H02M 7/219;
  (Continued)

(56) References Cited

U.S. PATENT DOCUMENTS

| 9,350,259 B2 * | 5/2016 | Ou ..................... H02M 3/33573 |
| 10,971,990 B1 * | 4/2021 | Rajesh ............... H02M 3/33523 |
| 11,165,362 B2 * | 11/2021 | Khamesra ............... H02M 7/06 |

OTHER PUBLICATIONS

Monolithic Power Systems, MP6908A Fast Turn-Off Intelligent Rectifier with No Need for Auxiliary Winding, May 27, 2020, 14 pages.

(Continued)

*Primary Examiner* — Jeffrey A Gblende (57) ABSTRACT

A primary-side-controlled fly-back converter is provided to eliminate cross-conduction between a power-switch (PS) on a primary side and a synchronous-rectifier (SR) on a secondary side when operating in continuous conduction mode (CCM). Generally, the converter includes a transformer having a primary coupled to a rectified AC input through the PS, and a secondary coupled to a DC output through the SR, the SR having a drain coupled to the secondary winding. A fly-back-controller includes a primary-controller operable to control a duty cycle of the PS, and a secondary-controller operable to turn OFF the SR when the PS turns ON in CCM. The secondary-controller includes a CCM zero-crossing-detector comparator having a first input coupled to the drain of the SR through a capacitor, and is operable to detect a sharp change in a drain voltage when the PS turns ON during CCM, and to output a signal to turn OFF the SR.

20 Claims, 8 Drawing Sheets

(58) Field of Classification Search
CPC ............ H02M 7/4815; H02M 1/0048; H02M 7/4818; H02M 7/4826; Y02B 70/1491
See application file for complete search history.

(56) References Cited

OTHER PUBLICATIONS

Texas Instruments Inc., UCC28781 Zero-Voltage-Switching Flyback Controller with Dedicated Synchronous Rectifier Gate-Drive, Dec. 2021, 83 pages.

* cited by examiner

SYNCHRONOUS RECTIFIER SCHEME FOR CONTINUOUS CONDUCTION MODE IN PRIMARY SIDE CONTROLLED FLY-BACK CONVERTER

TECHNICAL FIELD

This disclosure relates generally to switch-mode power supplies or converters, and more particularly to primary side controlled fly-back converters and circuits and methods of operating the same to avoid cross-conduction between a primary and secondary switch in continuous conduction mode operation.

BACKGROUND

Figure 1:
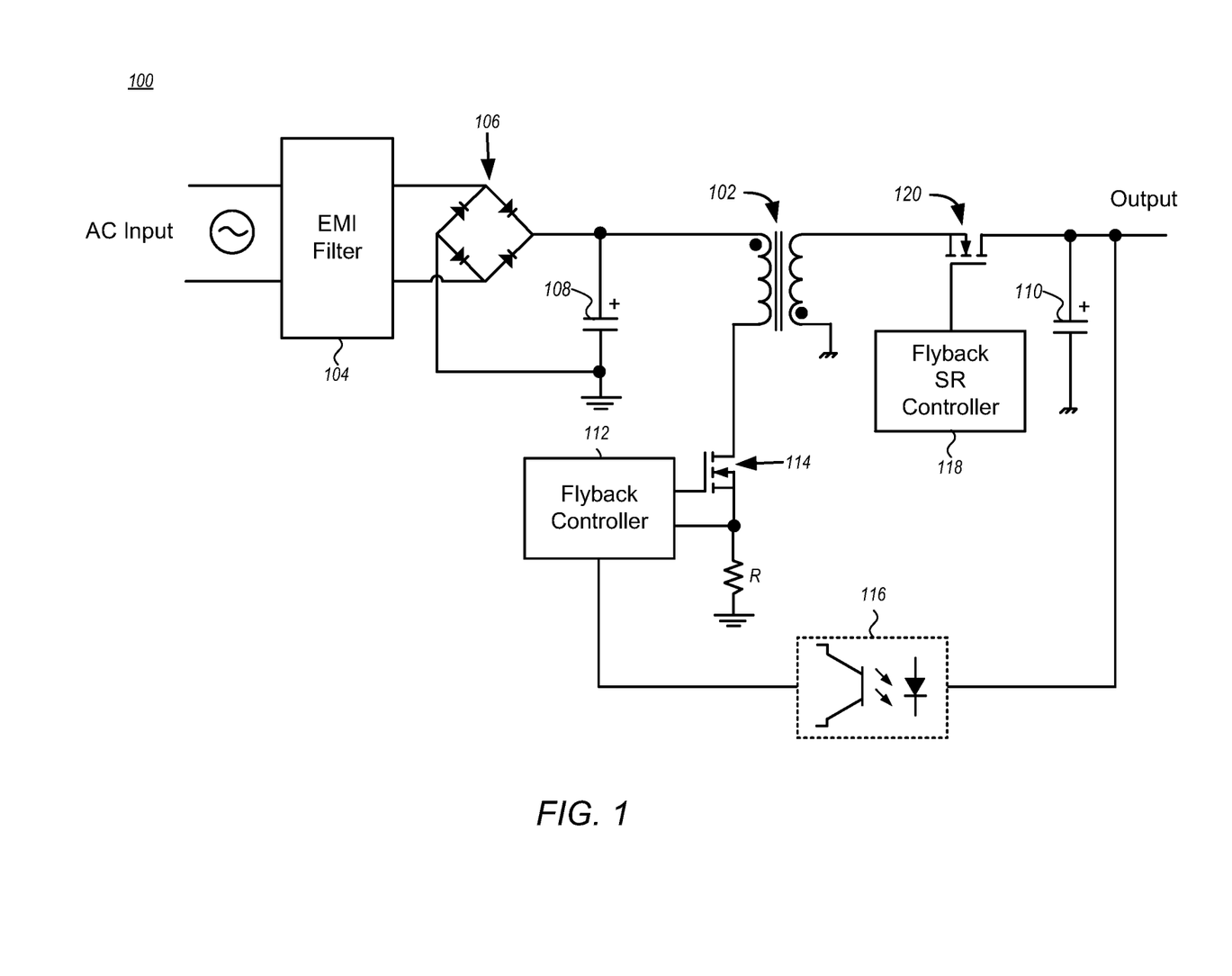
FIG. 1 is a simplified schematic block diagram illustrating a conventional Primary-Side-Controlled (PSC) fly-back converter.

Switch-mode power supplies (SMPSs) or converters are used to convert power from an alternating current (AC) source to a direct current (DC) at a specified voltage level. One type of SMPS widely utilized in portable consumer, industrial and medical applications is a primary side controlled (PSC) fly-back converter. Referring to FIG. 1 a PSC fly-back converter 100 generally includes a transformer 102 having a primary side electrically coupled to an AC input through an electromagnetic interference filter (EMI) filter 104 and a rectifying circuit, such as a bridge rectifier 106, and one or more input filter capacitors 108, and a secondary side coupled to a DC output through one or more output capacitors 110. On the primary side of the transformer 102 a fly-back-controller 112 controls an active rectification element or power switch (PS), such as a PS field effect transistor (PS_FET 114) to switch power to the primary side on or off in response to a feedback (FB) signal received the from the secondary side through an electrical isolation circuit 116. On the secondary side, a synchronous rectifier (SR) controller 118 senses voltage on the secondary side and turns a synchronous rectifier (SR), such as a SR field effect transistor (SR_FET 120) on and off in response to sensed voltage peaks, negative voltages and zero-crossings.

In operation of the PSC fly-back converter 100, during the time in which the PS_FET 114 is on or closed the SR_FET 120 is off or open, and the PSC fly-back converter is said to be operating in fly-back mode, and a magnetic field builds up in the transformer 102 while a current on the primary side increases linearly. When the PS_FET 114 is off or opened, and SR_FET 120 is on or closed, the PSC fly-back converter 100 transfers the power to secondary side, and the magnetic field begins to collapse while the secondary side current decreases steadily, but gradually as power is given to output capacitor 110 connected until a point is reached at which there is substantially zero current flow in the secondary side.

Generally, the PSC fly-back converters 100 can operate in one of two modes, depending on the power drawn from the DC output and the resultant ON-OFF cycle of the PS_FET 114. If the PS_FET 114 switches from OFF to ON before the transformer 102 is completely discharged the current in the primary side of the transformer does not start with zero current. This mode of operation is called continuous conduction mode (CCM). Alternately, if the off time of the PS_FET 114 lasts long enough for the primary side of the transformer 102 to completely discharge, then primary side current starts from zero current when PS_FET 114 switches from OFF to ON. This mode of operation is called discontinuous conduction mode (DCM).

One problem with previous generations of PSC fly-back converters 100 operating in CCM is cross-conductance between the PS_FET 114 and the SR_FET 120 can occur when both the PS_FET and the SR_FET are ON, resulting in a reduced efficiency of the PSC fly-back converter as well as danger of having high negative current in SR_FET causing huge voltage spikes when SR_FET is tuned-off which can ultimately reduce lifetime of SR_FET or even can damage the SR_FET.

Figure 2A:
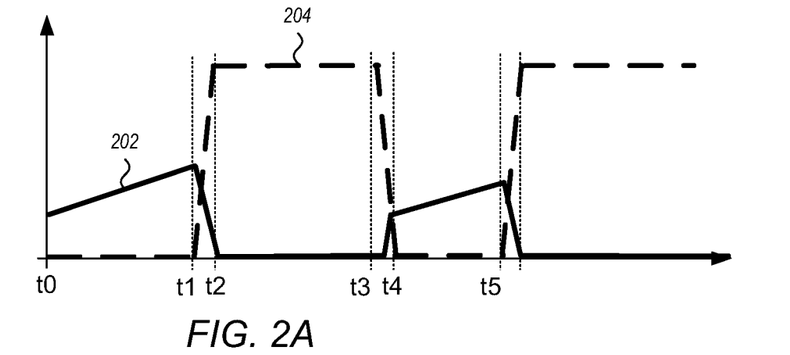
FIG. 2A is a graph showing waveforms of a current through a primary field effect transistor (FET) and a voltage on the drain of the primary FET in the PSC fly-back converter of FIG. 1 operating in continuous conduction mode (CCM)
Figure 2B:
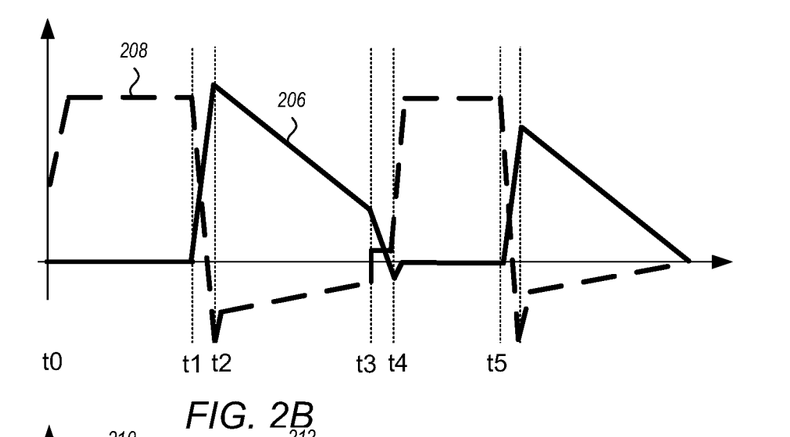
FIG. 2B is a graph showing waveforms of a current through a secondary FET in the PSC fly-back converter of FIG. 1 and a voltage on the drain of the secondary FET operating in CCM.
Figure 2C:
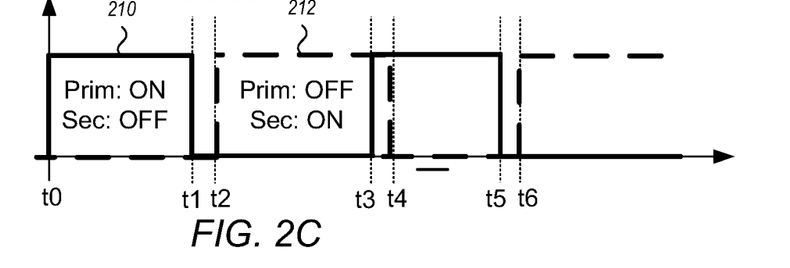
FIG. 2C is a timing diagram illustrating ON and OFF operation of the primary FET and secondary FET of the PSC fly-back converter of FIG. 1 operating in CCM.

FIG. 2A is a graph showing waveforms of a primary current 202 through the PS_FET 114 and a primary voltage 204 on a drain of the PS_FET in the PSC fly-back converter 100 of FIG. 1 operating in continuous conduction mode (CCM). FIG. 2B shows waveforms of the secondary current 206 through SR_FET 120 and secondary voltage 208 on a drain of the SR_FET during the same time or number of cycles of the PS_FET 114. FIG. 2C is a timing diagram illustrating ON and OFF operation of the PS_FET 114 and the SR_FET 120 of the PSC fly-back converter 100 during CCM operation.

Referring to FIGS. 2A through 2C it is seen that during time t3 to t4, both the PS_FET 114 (represented by line 210) and the SR_FET 120 (represented by line 212) can result in cross-conduction between PS_FET and the SR_FET if the detection of secondary side takes longer to turn-off SR_FET. The rapid changes in in secondary current 206 slope with elongated SR_FET remaining ON can result in high negative secondary current (206), resulting in a reduced efficiency of the PSC fly-back converter as well as reliability risk of damaging the SR_FET.

Accordingly there is a need for a PSC fly-back converter and method of operating the same that minimizes or substantially eliminates cross-conductance between a primary and a secondary switch during CCM operation that improves efficiency of the converter.

SUMMARY

A primary side controlled (PSC) fly-back converter and method of operating the same to minimize or substantially eliminate cross-conduction between a power switch (PS) on a primary side and a synchronous rectifier (SR) on a secondary side when operating in continuous conduction mode (CCM) is provided. The PSC fly-back converter includes a transformer, and a fly-back-controller. The transformer has a primary winding coupled to a rectified AC input through a power switch (PS), and a secondary winding coupled to a DC output through a synchronous rectifier field effect transistor (SR_FET), the SR_FET having a drain coupled to the secondary winding and a source coupled to the DC output. The fly-back-controller can be implemented as an integrated circuit (IC) comprising and includes a primary-side-controller operable to control a duty cycle of the PS based on power supplied to the DC output, and a secondary-side-controller operable to turn OFF the SR_FET when the PS turns ON in continuous conduction mode (CCM). The secondary-side-controller includes a CCM zero-crossing-detector (ZCD) comparator having a first input coupled to the drain of the SR_FET through a capacitor to receive a first voltage, and a second input coupled to receive a second voltage, the CCM ZCD comparator operable to detect a sharp change in a voltage on the drain of the SR_FET when the PS turning ON during CCM causes a sudden change in secondary current, and to output a signal to turn OFF the SR_FET.

In one embodiment, the first input of the CCM ZCD comparator is a non-inverting input, the second input is an inverting input, and the second voltage is a reference voltage.

In another embodiment, the first input of the CCM ZCD comparator is a non-inverting input, the second input is an inverting input, and the second input is coupled to the drain of the SR_FET through a voltage divider including both an external resistor (Rext) and an internal resistor (Rint) internal to the IC of the fly-back-controller. The slower response time of this resistive path as compared to that through the capacitor, enables the CCM ZCD comparator to detect the sharp change in a voltage on the drain of the SR_FET.

Further features and advantages of embodiments of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to a person skilled in the relevant art(s) based on the teachings contained herein.

BRIEF DESCRIPTION OF THE DRAWINGS

Embodiments of the invention will now be described, by way of example only, with reference to the accompanying schematic drawings in which corresponding reference symbols indicate corresponding parts. Further, the accompanying drawings, which are incorporated herein and form part of the specification, illustrate embodiments of the present invention, and, together with the description, further serve to explain the principles of the invention and to enable a person skilled in the relevant art(s) to make and use the invention.

DETAILED DESCRIPTION

A primary side controlled (PSC) fly-back converter including a fly-back-controller with integrated primary and secondary-side-controllers, and methods of operating the same are disclosed for improving efficiency and reliability across a wide range of loads and power delivery applications. The system and methods of the present disclosure are particularly useful in Universal Serial Bus Power Delivery (USB-PD) applications with wide output power applications ranging from 5 W to 100 W, and output voltages from 3.3V to 21.5V.

Figure 3:
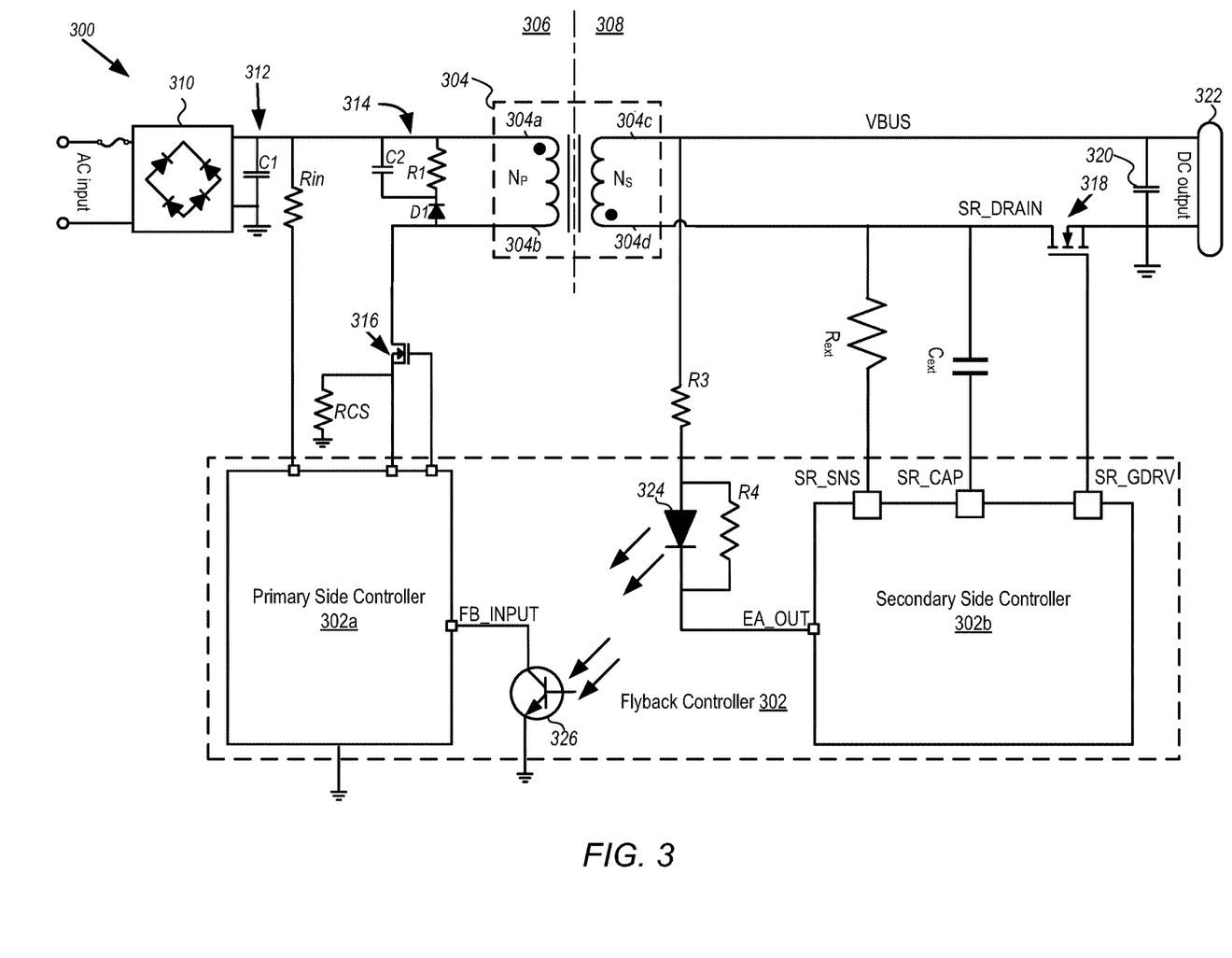
FIG. 3 is a schematic block diagram depicting an embodiment of a PSC fly-back converter including fly-back-controller with integrated primary and secondary-side-controllers.

An embodiment of a PSC fly-back converter including a fly-back-controller with integrated primary and secondary-side-controllers in accordance with the present disclosure will now be described with reference to FIG. 3. FIG. 3 is a schematic block diagram of a PSC fly-back converter 300 including a fly-back-controller 302 with primary-side-controller 302a and secondary-side-controller 302b.

Referring to FIG. 3, the PSC fly-back converter 300 generally includes a transformer 304 having a primary winding (NP) on a primary side 306 electrically connected or coupled to an AC input, and a secondary winding (NS) on a secondary side 308 coupled to a DC output.

On the primary side 306 a rectifying circuit, such as a bridge rectifier 310, and one or more input filters 312 coupled to a first terminal 304a of the transformer 304 rectify an AC input voltage and supply input power to the primary winding of the transformer 304. The input filters can include a first input filter 312 having a capacitor (C1) coupled to or across an output of the rectifier 310, and a snubber 314, including a resistor or resistive element (R1) and a capacitor (C2) coupled in parallel between the first terminal 304a of the transformer 304 and a cathode of a diode or rectifier (D1) having an anode coupled to a second terminal 304b of the transformer. Generally, as in the embodiment shown, the PSC fly-back converter 300 further includes a power switch (PS 316), such as a primary field effect transistor (PR_FET), having a first or drain node coupled to the second terminal 304b of the transformer 304, a second or gate node coupled to the primary-side-controller 302a, and a third or source node coupled to the primary-side-controller and, through a current sensing element, such as a resistive element (RCS) to ground to sense a primary side current (I_primary) flowing through the primary winding when the PS 316 is closed or conducting. Generally, as in the embodiment shown, the primary-side-controller 302a is further coupled to the first terminal 304a of the transformer 304 through a resistive element (Rin) to receive a voltage or signal equal or proportional to the rectified AC input voltage.

On the secondary side 308 the PSC fly-back converter 300 includes a synchronous rectifier (SR 318), such as a synchronous rectifier field effect transistor (SR_FET), coupled between a fourth terminal 304d of the transformer 304 and the ground terminal of the DC output. The first or drain node of the SR 318 is coupled to the fourth terminal 304d of the transformer 304 and through an external resistor (Rext) and external capacitor (Cext) to a SR sense pin (SR_SNS) and SR capacitive pin (SR_CAP) on the secondary-side-controller 302b; a second or gate node coupled to a SR gate drive pin (SR_GDRV) on the secondary-side-controller to drive or control the SR; and a third or source node coupled to the ground terminal of the DC output. The Cext can have a capacitance, for example, of about 10 pico-farads.

The PSC fly-back converter 300 further includes on the secondary side 308 a filter or output capacitor 320 coupled between a third terminal 304c of the transformer 304 and the ground terminal to provide a DC output voltage to an output interface or connector 322. Although not shown, the output connector 322 is generally further coupled to the fly-back-controller 302 through a number of communication channels to support various charging protocols. Suitable output connectors 322 can include those compatible with and supporting standard and proprietary charging protocols including Universal Serial Bus Power Delivery USB PD2.0 and USB PD3 with Programmable Power Supply (PPS), Qualcomm® Quick Charge, Samsung® AFC, and Apple® charging protocols. For example, the connector can include a Universal Serial Bus type C (USB-C) compatible connector where the PSC fly-back converter 300 is compliant with the USB protocol to provide a DC output voltage of about 3.3 VDC to about 21.5 VDC at a current of from about 0 to about 5000 milliamps (mA).

In some embodiments, the PSC fly-back converter 300 further includes an isolation circuit or barrier through which a signal is provided to the primary-side-controller 302a from the secondary-side-controller 302b. Referring to FIG. 3, in the embodiment shown the isolation circuit a light emitting element, such as a light emitting diode (LED) 324 and a light sensitive element, such as a light sensitive or phototransistor 326. The LED 324 has a cathode coupled to an error amplifier output pin (EA_OUT) on the secondary-side-controller 302b, and an anode coupled to the third terminal 304c of the transformer 304 through a voltage divider including a first resistive element (R3) and a second resistive element (R4). The phototransistor 326 can include a bipolar NPN transistor, and is coupled to the primary-side-controller 302a through a feedback input pin (FB_INPUT).

Figure 4:
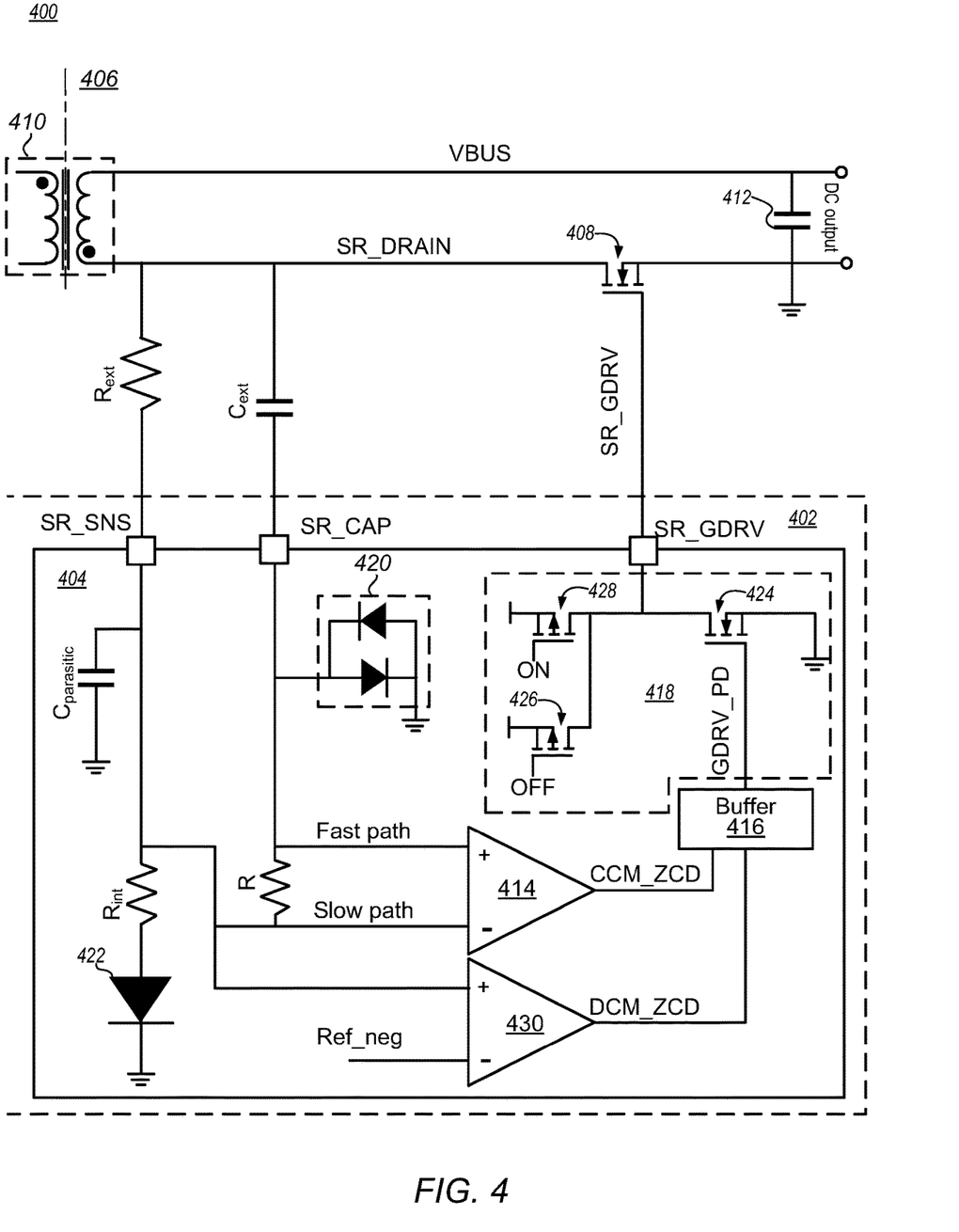
FIG. 4 is a schematic block diagram depicting an embodiment of a PSC fly-back converter with a fly-back-controller including an integrated secondary-side-controller with a circuit operable to turn OFF a synchronous rectifier FET (SR_FET) in a PSC fly-back converter to minimize or substantially eliminate cross-conduction when operating in CCM.

In accordance with the present disclosure the PSC fly-back converter includes a fly-back-controller with an integrated secondary-side-controller with a circuit operable to turn OFF a SR in secondary side to minimize or substantially eliminate cross-conduction when operating in CCM. FIG. 4 is a schematic block diagram depicting an embodiment of one such PSC fly-back converter 400 with a fly-back-controller 402 including an integrated secondary-side-controller 404 with such a circuit. Referring to FIG. 4 the PSC fly-back converter 400 includes on the secondary side 406 a synchronous rectifier (SR 408), such as a synchronous rectifier field effect transistor (SR_FET), coupled between a transformer 410 and the ground terminal of the a DC output, and a filter or output capacitor 412. The SR 408 includes a first or drain node of is coupled to a first terminal of the transformer 410 and through an external resistor (Rext) and external capacitor (Cext) to a SR sense pin (SR_SNS) and SR capacitive pin (SR_CAP) on the secondary-side-controller 404; a second or gate node coupled to a SR gate drive pin (SR_GDRV) on the secondary-side-controller to drive or control the SR; and a third or source node coupled to the ground terminal of the DC output.

The integrated secondary-side-controller 404 includes a first or (CCM) zero-crossing detector (ZCD) comparator 414 coupled through a buffer 416 to a gate drive circuit or gate driver 418 for the SR 408. A first, positive or non-inverting input to the CCM ZCD comparator 414 is coupled to SR_CAP and internally clamped to a voltage of +/−0.7V using a clamping circuit including back-to-back diodes 420. A second, negative or inverting input to the CCM ZCD comparator 414 is coupled to SR_SNS through a voltage divider formed by the external resistor (Rext) and an internal resistor (Rint) coupled between the SR_SNS pin and through an internal rectifier 422 to ground. The internal rectifier 422 may be a PN diode (as shown), or alternatively, a synchronous diode or a FET configured or connected to function as a diode. The internal rectifier 422 ensures that during negative sensing or zero-crossing operations there is substantially no current flow through the voltage divider, thereby allowing a full, undivided negative voltage on the drain node the SR 408 to be coupled to the SR-SNS pin.

Resistance of a resistor (R) coupled between the first input and the second input of the CCM ZCD comparator 414, defines a common mode input voltage of the CCM ZCD comparator. During CCM, with primary FET turning-on, current in secondary side would have a sudden change in slope. The sudden change in slope of the secondary side current results in sharp change in SR_DRAIN profile due to parasitic lead inductances of the SR_FET.

The gate driver 418 includes a strong pull-down transistor, such as an N-type FET (NFET 424) in the embodiment shown, coupled between the SR_GDRV pin and ground to pull-down or turn off the gate of the SR 408 in response to gate drive pull-down (GDRV_PD) signal from the buffer 416, and strong pull-up P-type FET (PFET 426) and a weak pull-up transistor (PFET 428).

Optionally or preferably, the secondary-side-controller 404 further includes a second or discontinuous conduction mode (DCM) ZCD comparator 430 for detecting zero crossings when the PSC fly-back converter 400 is operated in a discontinuous conduction mode in which there no possibility of cross conduction between a primary switch and the SR 408. The DCM ZCD comparator 430 includes a first, positive or non-inverting input is coupled to the SR_SNS through the voltage divider formed by Rext and Rint, a second, negative or inverting input coupled to a negative reference voltage (Ref_neg), and an output coupled through the buffer 416 to the gate driver 418 for the SR 408. The negative reference voltage (Ref_neg) can be from −700 mV to +200 mV, and is selected to provide a desired zero crossing trip point at which to turn OFF the SR 408 during discontinuous conduction mode operation.

Figure 5A:
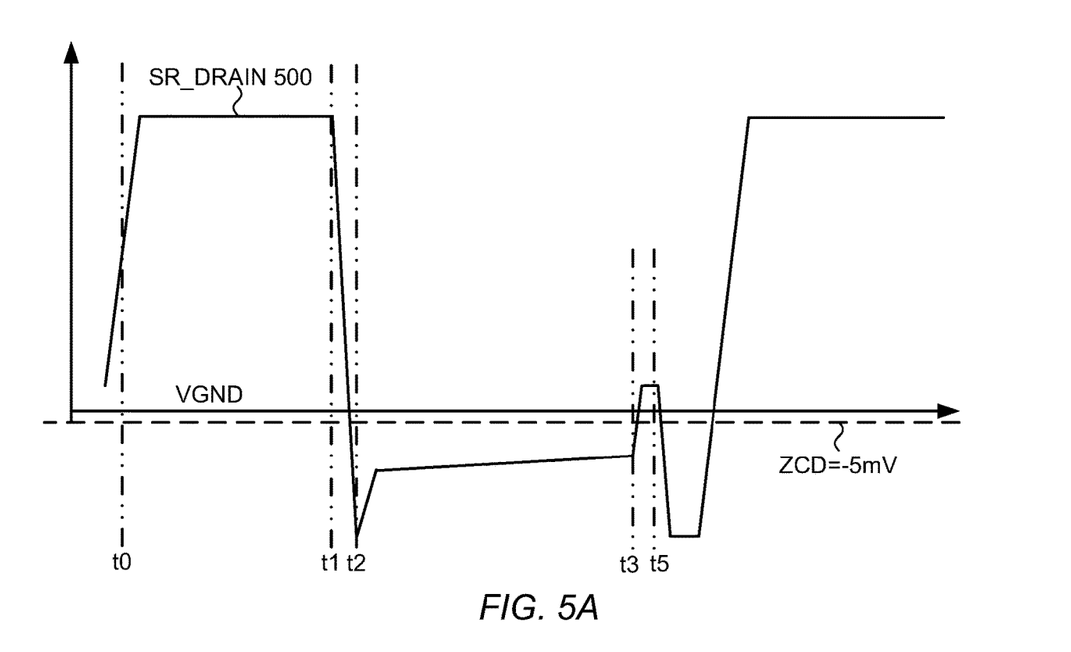
FIG. 5A is a graph showing a waveform of a voltage on the drain of the SR_FET in the circuit of FIG. 4 when the PSC fly-back converter is operating in CCM.
Figure 5B:
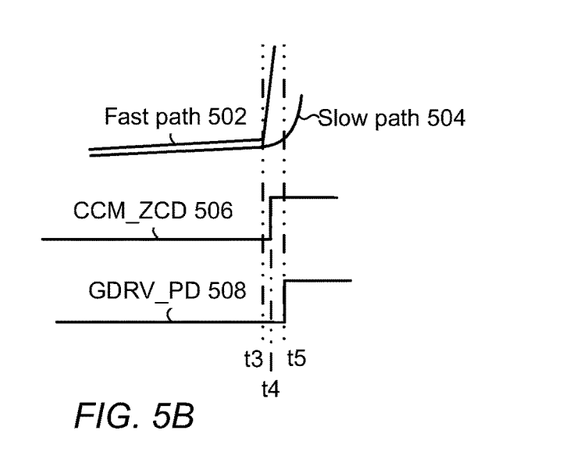
FIG. 5B is a graph showing waveforms of voltages into fast path and slow path inputs to a zero crossing detector (ZCD) comparator in the circuit of FIG. 4, and timing diagrams of CCM_ZCD signal out of the comparator to a buffer and a drive signal (GDRV_PD) out of the buffer.

Operation of the PSC fly-back converter 400 to minimize or substantially eliminate cross-conduction when in continuous conduction mode (CCM) will now be described with reference to FIGS. 5A and 5B. FIG. 5A is a graph of a voltage on the drain of the SR 408 in the circuit of FIG. 4 when the PSC fly-back converter 400 is operating in CCM. FIG. 5B is a graph showing waveforms of voltages into inputs to the CCM ZCD comparator 414, and timing diagrams of a CCM_ZCD signal out of the comparator and into the buffer 416.

Referring to FIG. 5A at an initial time from t0 to t1 a PS (316 in FIG. 3, not shown in FIG. 4) in the PSC fly-back converter 400 is ON and a SR 408 is OFF causing a voltage on the SR drain (SR_DRAIN 500) to rise to a maximum, positive voltage. The PSC fly-back converter 400 is not yet operating in a CCM or experiencing cross-conduction between the PS and the SR 408. At time t1, a primary-sidecontroller 302a in FIG. 3, not shown in FIG. 4) in the PSC fly-back converter 400 turns the PS OFF causing the SR drain voltage (SR_DRAIN 500) to fall. From time t1 to t2 both the PS and the SR 408 are OFF. At time t2 a secondary-side-controller 404 turns the SR 408 ON causing the SR drain voltage (SR_DRAIN 500) to rise rapidly at first followed by a more gradual rise as the secondary inductor releases energy to the output VBUS and secondary side (406) current gradually reduces via SR_FET (408). At time t3 the fly-back-controller 402, depending upon the power requirement at the output VBUS, causes the primary-side-controller to turn ON the PS (316 in FIG. 3, not shown in FIG. 4) resulting in a rapid rise in the SR drain voltage (SR_DRAIN 500) that is sensed on the fast path input to the CCM ZCD comparator 414, represented in FIG. 5B by line 502, which is coupled to the SR_DRAIN through the external capacitor (Cext), and more slowly by the slow path input, represented in FIG. 5B by line 504, which is coupled to the SR_DRAIN through the SR_SNS pin and the voltage divider formed by the external resistor (Rext) and internal resistor (Rint). It is noted that the fast rising signal on the SR_CAP pin is clamped to +/−0.7 volts by back-to-back diodes 420.

The difference between the fast path and the slow path inputs causes the CCM ZCD comparator 414 to output a high CCM ZCD signal 506 within about 10 nanoseconds (ns) at time t4 which is coupled to the buffer 416. After a predetermined time delay of about 15 ns, and the buffer 416 outputs a high gate drive pull down signal (GDRV_PD 508) to the NFET 424 in the gate driver 418 causing the SR 408 to turn OFF at t5, minimizing or substantially eliminate cross-conduction between the PS and the SR when the PSC fly-back converter 400 is operating in CCM.

Optionally or preferably, as in the embodiment shown in FIG. 4, the gate driver 418 includes a strong PFET 426 and a weak PFET 428 coupled in parallel to the SR_GDRV pin, with the strong PFET operable for brief time to quickly turn ON the SR 408 at time t2, and the weak PFET operable to maintain the SR ON to enable, so that a 'break-before-make' is not required, and the SR can be quickly turned OFF when a zero-crossing is detected in CCM.

Figure 6:
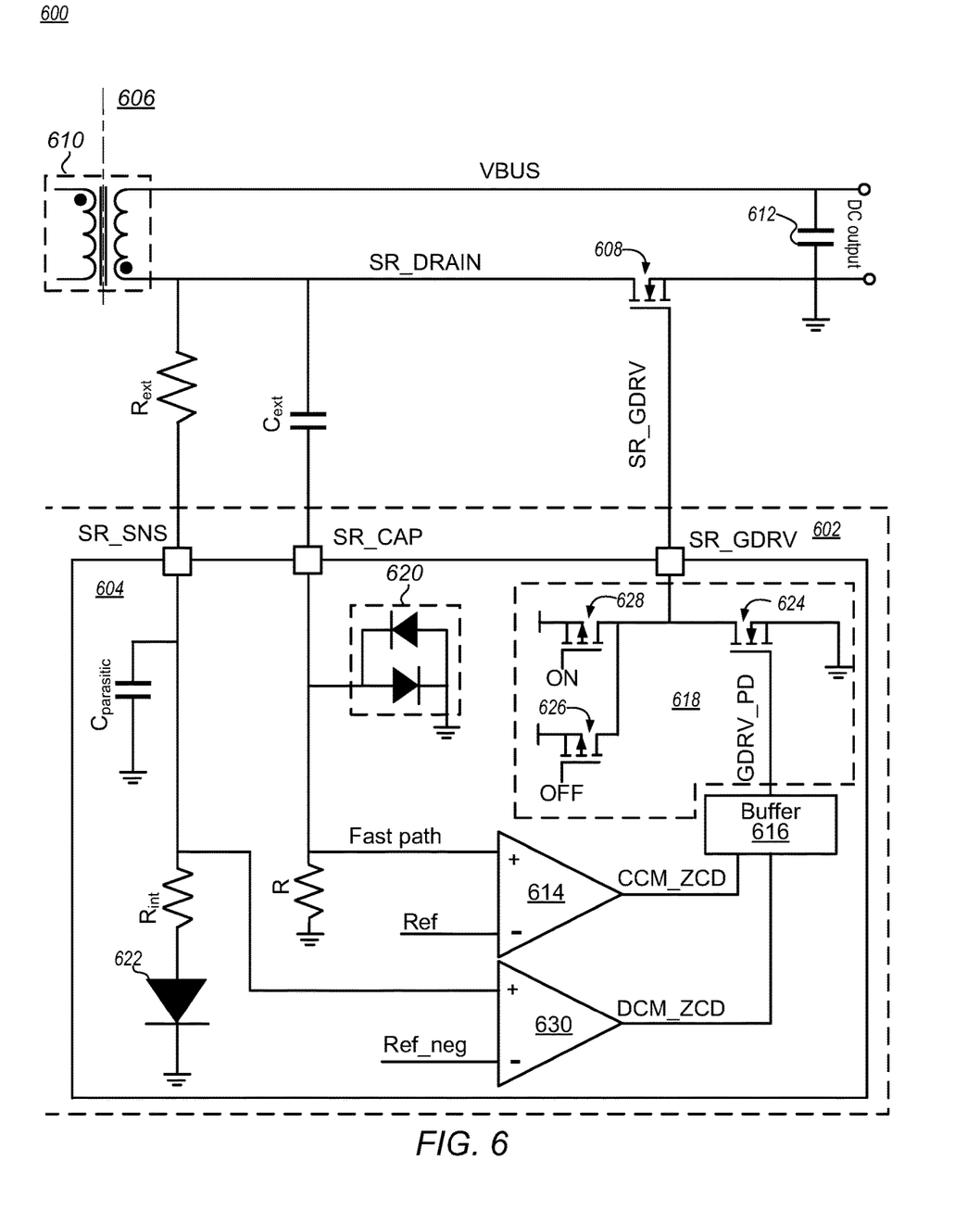
FIG. 6 is a schematic block diagram depicting another embodiment of a circuit to turn OFF a SR_FET in a PSC fly-back converter to minimize or substantially eliminate cross-conduction when operating in CCM.

Another embodiment of a PSC fly-back converter 600 with a fly-back-controller 602 including an integrated secondary-side-controller 604 with a circuit operable to minimize or substantially eliminate cross-conduction when operating in CCM is shown in FIG. 6. Referring to FIG. 6 the PSC fly-back converter 600 includes on a secondary side 606 a synchronous rectifier (SR 608), such as a synchronous rectifier field effect transistor (SR_FET), coupled between a transformer 610 and the ground terminal of the a DC output, and a filter or output capacitor 612. The SR 608 includes a first or drain node of is coupled to a first terminal of the transformer 610 and through an external resistor (Rext) and external capacitor (Cext) to a SR sense pin (SR_SNS) and SR capacitive pin (SR_CAP) on the secondary-side-controller 604; a second or gate node coupled to a SR gate drive pin (SR_GDRV) on the secondary-side-controller to drive or control the SR; and a third or source node coupled to the ground terminal of the DC output.

The integrated secondary-side-controller 604 includes a first or (CCM) zero-crossing detector (ZCD) comparator 614 coupled through a buffer 616 to a gate drive circuit or gate driver 618 for the SR 608. A first, positive or non-inverting input to the CCM ZCD comparator 614 is coupled to SR_CAP and internally clamped to a voltage of +/−0.7V using back-to-back diodes 620, along with a resistance R to ground. A second, negative or inverting input to the CCM ZCD comparator 614 is coupled to a reference voltage (Ref) typically ~+10 mV to +100 mV (programmable). The internal rectifier 622 may be a PN diode (as shown), or alternatively, a synchronous diode or a FET configured or connected to function as a diode. The internal rectifier 622 ensures that during negative sensing or zero-crossing operations there is substantially no current flow through the voltage divider, thereby allowing a full, undivided negative voltage on the drain node the SR 608 to be coupled to the SR-SNS pin.

The gate driver 618 includes a strong pull-down transistor, such as an N-type FET (NFET 624) in the embodiment shown, coupled between the SR_GDRV pin and ground to pull-down or turn off the gate of the SR 608 in response to gate drive pull-down (GDRV_PD) signal from the buffer 616, and strong pull-up P-type FET (PFET 626) and a weak pull-up transistor (PFET 628).

Optionally or preferably, the secondary-side-controller 604 further includes a second or discontinuous conduction mode (DCM) ZCD comparator 630 for detecting zero crossings when the PSC fly-back converter 600 is operated in a discontinuous conduction mode in which there no possibility of cross conduction between a primary switch and the SR 608. The DCM ZCD comparator 630 includes a first, positive or non-inverting input is coupled to the SR_SNS through the voltage divider formed by Rext and Rint, a second, negative or inverting input coupled to a negative reference voltage (Ref_neg), and an output coupled through the buffer 616 to the gate driver 618 for the SR 608. The negative reference voltage (Ref_neg) can be from −700 mV to +200 mV, and is selected to provide a desired zero crossing trip point at which to turn OFF the SR 608 during discontinuous conduction mode operation.

Figure 7A:
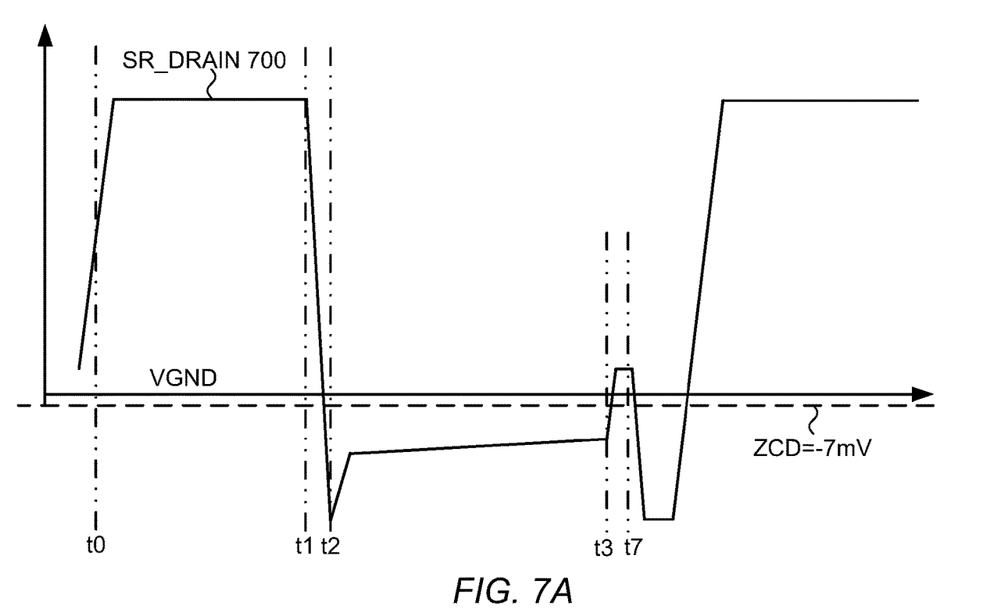
FIG. 7A is a graph showing a waveform of a voltage on the drain of the SR_FET in the circuit of FIG. 6 when the PSC fly-back converter is operating in CCM.
Figure 7B:
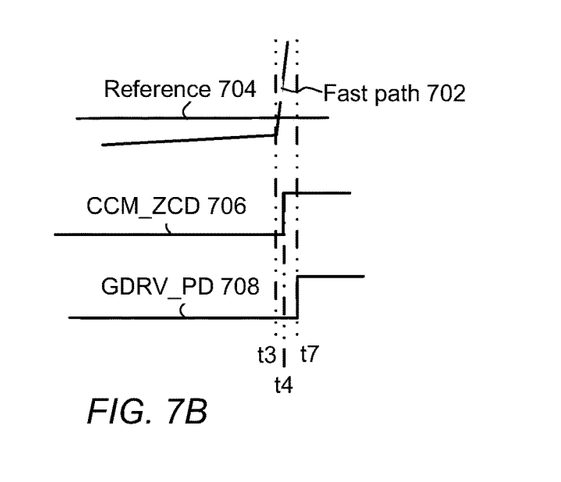
FIG. 7B is a graph showing a waveform of voltage on the drain of the SR_FET in the circuit of FIG. 6, and timing diagrams of a CCM_ZCD signal and a GDRV_PD signal.

Operation of the PSC fly-back converter 600 to minimize or substantially eliminate cross-conduction when in continuous conduction mode (CCM) will now be described with reference to FIGS. 7A and 7B. FIG. 7A is a graph of a voltage on the drain of the SR 608 in the circuit of FIG. 6 when the PSC fly-back converter 600 is operating in CCM. FIG. 7B is a graph showing waveforms of voltages into inputs to the CCM ZCD comparator 614, and timing diagrams of a CCM_ZCD signal out of the comparator and into the buffer 616.

Referring to FIG. 7A at an initial time from t0 to t1 a PS (316 in FIG. 3, not shown in FIG. 6) in the PSC fly-back converter 600 is ON and a SR 608 is OFF causing a voltage on the SR drain (SR_DRAIN 700) to rise to a maximum, positive voltage. The PSC fly-back converter 600 is not yet operating in a CCM or experiencing cross-conduction between the PS and the SR 608. At time t1, a primary-side-controller 302a in FIG. 3, not shown in FIG. 4) in the PSC fly-back converter 600 turns the PS OFF causing the SR drain voltage (SR_DRAIN 700) to fall. From time t1 to t2 both the PS and the SR 608 are OFF. At time t2 a secondary-side-controller 604 turns the SR 608 ON causing the SR drain voltage (SR_DRAIN 700) to rise rapidly at first followed by a more gradual rise as the secondary inductor releases energy to the output VBUS and secondary side (606) current gradually reduces via SR_FET (608). At time t3 the fly-back-controller 602, depending upon the power requirement at the output VBUS, causes the primary-side-controller to turn ON the PS (316 in FIG. 3, not shown in FIG. 4) resulting in a rapid rise in the SR drain voltage (SR_DRAIN 700) that is sensed on the fast path input to the CCM ZCD comparator 614, represented in FIG. 7B by line 702, which is coupled to the SR_DRAIN through the external capacitor (Cext). It is noted that the fast rising signal on the SR_CAP pin is clamped to +/−0.7 volts by back-to-back diodes 620.

The signal on the fast input is compared by the CCM ZCD comparator 614 to a fixed reference voltage of about +50 millivolts typically, represented in FIG. 7B by line 704. The difference between the fast path and the reference inputs causes the CCM ZCD comparator 614 to output a high CCM ZCD signal 706 in less than about 10 nanoseconds (ns), at time t3 which is coupled to the buffer 616. After a predetermined time delay of about 15 ns and the buffer 616 outputs a high gate drive pull down signal (GDRV_PD 708) at t7 to the NFET 624 in the gate driver 618 causing the SR 608 to turn OFF, minimizing or substantially eliminate cross-conduction between the PS and the SR when the PSC fly-back converter 600 is operating in CCM.

Optionally or preferably, as in the embodiment shown in FIG. 6, the gate driver 618 includes a strong PFET 626 and a weak PFET 628 coupled in parallel to the SR_GDRV pin, with the strong PFET operable for brief period of time to quickly turn ON the SR 608, and the weak PFET operable to maintain the SR ON to enable, so that a 'break-before-make' is not required, and the SR can be quickly turned OFF when a zero-crossing is detected in CCM.

Figure 8:
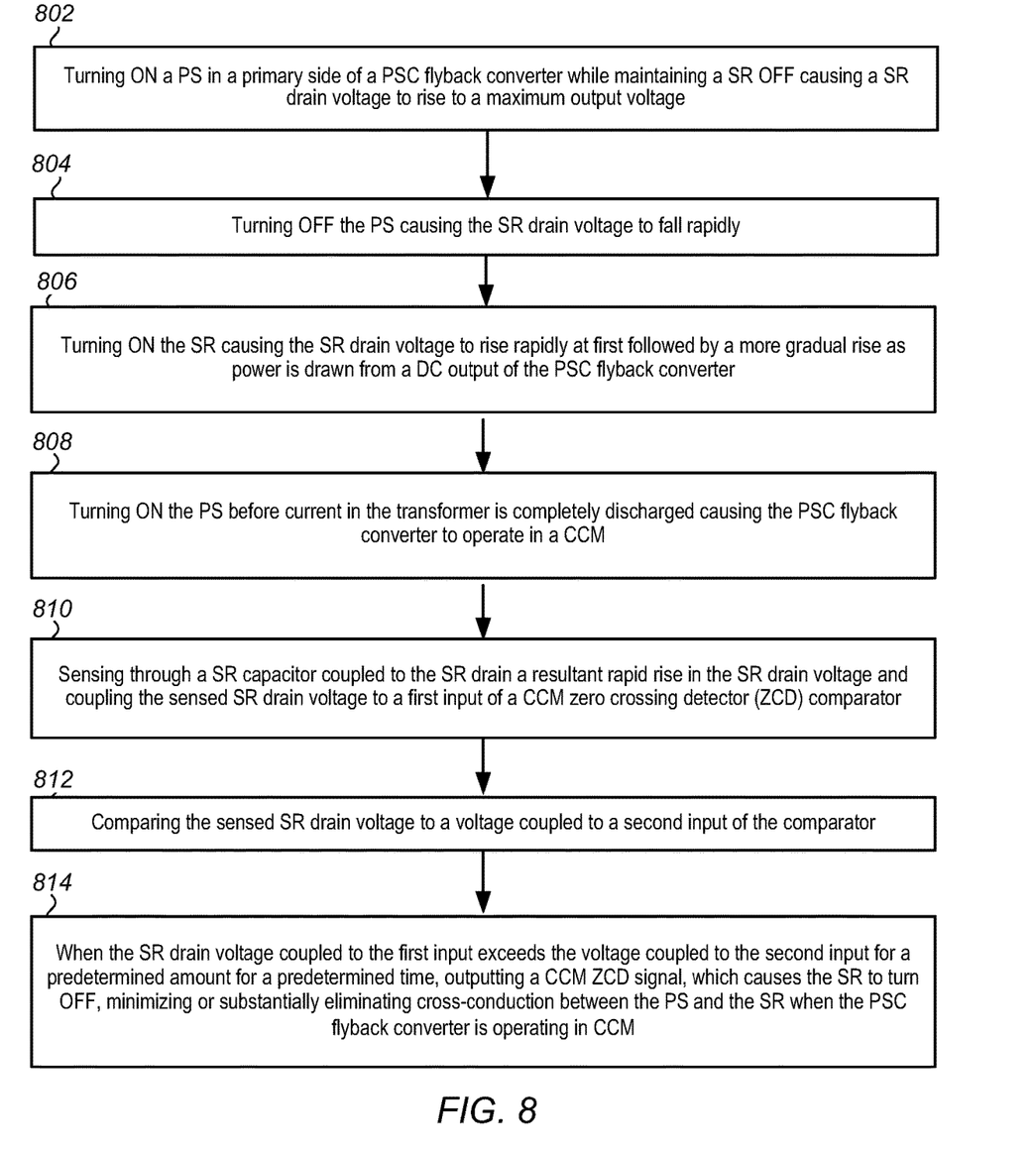
FIG. 8 is a flowchart illustrating an embodiment of a method for operating a PSC fly-back converter including the circuit of FIG. 4 or FIG. 6 to minimize or substantially eliminate cross-conduction when operating in CCM.

A method of operating a primary side controlled (PSC) fly-back converter to minimize or substantially eliminate cross-conduction between a power switch (PS) on a primary side and a synchronous rectifier (SR) on a secondary side when operating in CCM will now be described with reference to the flowchart of FIG. 8. Referring to FIG. 8 the method begins with turning ON a PS in a primary side of a PSC fly-back converter coupling a rectified and filtered AC input to a primary side of a transformer, while maintaining a SR in a secondary side OFF causing a SR drain voltage to rise to a maximum voltage (802). As described above with respect to FIGS. 3, 4 and 6, the PS is controlled by a primary-side-controller while the SR is controlled by a secondary-side-controller. Preferably, both of the primary and the secondary-side-controller are integrally formed in a single fly-back-controller as shown in FIG. 3. More preferably, the secondary-side-controller includes a circuit operable to minimize or substantially eliminate cross-conduction when operating in CCM, as described above with respect to either FIG. 4 or FIG. 6.

Next, the PS is turned OFF causing the SR drain voltage to fall rapidly (804). Generally, the PS is controlled by a pulse width modulated (PWM) signal from the primary-side-controller a duty cycle of which is controlled to provide a desired DC output power. It is noted that at this time both the PS and the SR are OFF, and that the PSC fly-back converter is not yet operating in a CCM or experiencing cross-conduction between the PS and the SR The SR is then turned ON causing the SR drain voltage to rise rapidly at first followed by a more gradual rise the secondary inductor releases energy to the output VBUS and secondary side (406) current gradually reduces via SR_FET of the PSC fly-back converter (806). Generally, the SR is quickly turned ON using a strong PFET switching transistor in the gate driver, and, after a predetermined brief time, for example about 100 ns, maintained ON by a weak PFET switching transistor coupled in parallel the strong PFET. The strong and the weak PFET are controlled by gate signals originating from the fly-back-controller or secondary-side-controller. As noted above, because the SR is maintained ON by only the weak PFET the circuit in the secondary-side-controller operable to minimize or substantially eliminate cross-conduction is operable to quickly turn OFF the SR can be when a zero-crossing is detected in CCM without a 'break-before-make' condition being required.

Next, the PS is then turned ON before current in the transformer is completely discharged causing the PSC fly-back converter to operate in a CCM (808).

A resultant rapid rise in a SR drain voltage is then sensed through a SR capacitor connected to the SR drain and coupled to a first input of a CCM zero crossing detector (ZCD) comparator (810). It is noted that the fast rising signal on the SR_CAP pin is clamped to +/−0.7 volts by back-to-back diodes, as shown in FIGS. 4 and 6.

The sensed SR drain voltage is then compared to a voltage coupled to a second input of the comparator (812). This voltage coupled to the second input can be either voltage on the SR drain coupled to an SR_SNS pin through an external resistor (Rext) and to the second input through the voltage divider formed by the Rext and an internal resistor (Rint), as shown in FIG. 4, or a reference voltage, as shown in FIG. 6. It is noted that when voltage coupled to the second input is from the SR_SNS pin, although this voltage will also rise, as shown in FIG. 5B, it will not do so as quickly as that coupled to the first input, thus the first input may be referred to as the fast path input and the second as the slow path input.

When the SR drain voltage coupled to the first input exceeds the voltage coupled to the second input for a predetermined amount for a predetermined time, a CCM ZCD signal output from the CCM ZCD comparator, which causes the SR to turn OFF, minimizing or substantially eliminating cross-conduction between the PS and the SR when the PSC fly-back converter is operating in CCM (814). Generally, as shown in FIGS. 4 and 6, the CM ZCD signal is coupled to a buffer, a gate drive pull down signal (GDRV_PD) generated in the buffer and coupled to as strong pull down NFET switching transistor in a gate driver, which then causes the SR to turn OFF.

Thus, a PSC fly-back converter to minimize or substantially eliminate cross-conduction between a PS on a primary side and a SR on a secondary side when operating in CCM have been disclosed. Embodiments of the present invention have been described above with the aid of functional and schematic block diagrams illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

It is to be understood that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The breadth and scope of the present invention should not be limited by any of the above-described exemplary embodiments, but should be defined only in accordance with the following claims and their equivalents.

What is claimed is:

1. A Primary Side Controlled (PSC) fly-back converter comprising:
a transformer having a primary winding coupled to a rectified AC input through a power switch (PS), and a secondary winding coupled to a DC output through a synchronous rectifier field effect transistor (SR_FET), the SR_FET having a drain coupled to the secondary winding and a source coupled to the DC output; and
a fly-back-controller implemented as an integrated circuit (IC) comprising:
a primary-side-controller operable to control a duty cycle of the PS based on power supplied to the DC output; and
a secondary-side-controller operable to turn OFF the SR_FET when the PS turns ON in continuous conduction mode (CCM), the secondary-side-controller including a CCM zero-crossing-detector (ZCD) comparator having a first input coupled to the drain of the SR_FET through a capacitor to receive a first voltage, and a second input coupled to receive a second voltage, the CCM ZCD comparator operable to detect a change in a voltage on the drain of the SR_FET during CCM when the PS turning ON causes a change in secondary current, and to output a signal to turn OFF the SR_FET.

2. The PSC fly-back converter of claim 1 wherein the capacitor through which the first input of the CCM ZCD comparator is coupled to the drain of the SR_FET is an external capacitor (Cext) external to the fly-back-controller, and coupled thereto through a SR_CAP pin on the IC.

3. The PSC fly-back converter of claim 2, wherein the secondary-side-controller further comprises a clamping circuit coupled between the SR_CAP pin and the first input of the CCM ZCD comparator, the clamping circuit operable so that a voltage on the first input does not exceed +/−0.7 volts.

4. The PSC fly-back converter of claim 3, wherein the external capacitor has a capacitance of about 10 pico-Farads.

5. The PSC fly-back converter of claim 1 further comprising a gate drive circuit including a N-type field effect transistor (NFET) through which a gate of the SR_FET can be coupled to ground to turn OFF the SR_FET in response to the signal output by the CCM ZCD comparator.

6. The PSC fly-back converter of claim 5, wherein the secondary-side-controller further comprises a buffer through which the signal output by the CCM ZCD comparator is coupled to the NFET in the gate drive circuit.

7. The PSC fly-back converter of claim 5, wherein the gate drive circuit further comprises a first P-type field effect transistor (PFET) and a second PFET coupled in parallel to the gate of the SR_FET, the first PFET operable to turn ON the SR_FET, and the second PFET operable to maintain the SR_FET ON, so that the NFET can quickly turn OFF the SR_FET in response to the signal output by the CCM ZCD comparator.

8. The PSC fly-back converter of claim 1, wherein the first input is a non-inverting input, the second input is an inverting input and the second voltage is a reference voltage.

9. The PSC fly-back converter of claim 8, further comprising a resistor coupled between the first input and ground.

10. The PSC fly-back converter of claim 1, wherein the first input is a non-inverting input, the second input is an inverting input, and wherein the second input is coupled to the drain of the SR_FET through a voltage divider including both an external resistor (Rext) and an internal resistor (Rint) internal to the IC of the fly-back-controller.

11. The PSC fly-back converter of claim 10, further comprising a resistor coupled between the first input and the second input of the CCM ZCD comparator, wherein a resistance of the resistor defines a common mode input voltage of the CCM ZCD comparator.

12. The PSC fly-back converter of claim 10 further comprising a discontinuous conduction mode zero-crossing-detector (DCM ZCD) comparator having a first non-inverting input coupled to the drain of the SR_FET through the external resistor of the voltage divider, and a second inverting input coupled to a negative reference voltage, the DCM ZCD comparator operable to detect a zero crossing of the voltage on the drain of the SR_FET when the PSC fly-back converter is operating in discontinuous conduction mode (DCM).

13. A Primary Side Controlled (PSC) fly-back converter comprising:
a transformer having a primary winding coupled to a rectified AC input through a power switch (PS), and a secondary winding coupled to a DC output through a synchronous rectifier field effect transistor (SR_FET), the SR_FET having a drain coupled to the secondary winding and a source coupled to the DC output; and
a fly-back-controller implemented as an integrated circuit (IC) comprising:
a primary-side-controller operable to control a duty cycle of the PS based on power supplied to the DC output; and
a secondary-side-controller operable to turn OFF the SR_FET when the PS turns ON in continuous conduction mode (CCM), the secondary-side-controller including a CCM zero-crossing-detector (ZCD) comparator having a first input coupled to the drain of the SR_FET through a capacitor to receive a first voltage, and a second input coupled to the drain of the SR_FET through a voltage divider including both an external resistor (Rext) external to the IC of the fly-back-controller and an internal resistor (Rint), the CCM ZCD comparator operable to detect a change in a voltage on the drain of the SR_FET during CCM when the PS turning ON causes a change in secondary current, and to output a signal to a gate drive circuit to turn OFF the SR_FET.

14. The PSC fly-back converter of claim 13 wherein the capacitor through which the first input of the CCM ZCD comparator is coupled to the drain of the SR_FET is an external capacitor (Cext) external to the fly-back-controller, and coupled thereto through a SR_CAP pin on the IC, and wherein the secondary-side-controller further comprises a clamping circuit coupled between the SR_CAP pin and the first input of the CCM ZCD comparator, the clamping circuit operable so that a voltage on the first input does not exceed +/−0.7 volts.

15. The PSC fly-back converter of claim 13, wherein the gate drive circuit further comprises a N-type field effect transistor (NFET) through which the gate of the SR_FET can be coupled to ground to turn OFF the SR_FET in response to the signal output by the CCM ZCD comparator.

16. The PSC fly-back converter of claim 15, wherein the gate drive circuit further comprises a first P-type field effect transistor (PFET) and a second PFET coupled in parallel to the gate of the SR_FET, the first PFET to turn ON the SR_FET, and the second PFET operable to maintain the SR_FET ON, so that the NFET can quickly turn OFF the SR_FET in response to the signal output by the CCM ZCD comparator.

17. A method of operating a Primary Side Controlled (PSC) fly-back converter, the method comprising:
    turning ON a power-switch (PS) in a primary side of a transformer while maintaining a synchronous-rectifier (SR) field effect transistor (SR_FET) in a secondary side of the transformer OFF causing a SR drain voltage to rise to a maximum voltage;
    turning OFF the PS;
    turning ON the SR_FET causing the SR drain voltage to rise at a first rate followed by a continued rise at a second rate, lower than the first rate, as power is drawn from a DC coupled to the secondary side of the transformer through the SR_FET;
    turning ON the PS before current in the transformer is completely discharged causing the PSC fly-back converter to operate in a CCM;
    sensing through a SR capacitor coupled to the SR drain a resultant rise in the SR drain voltage and coupling the sensed SR drain voltage to a first input of a CCM zero crossing detector (ZCD) comparator;
    comparing the sensed SR drain voltage to a voltage coupled to a second input of the CCM ZCD comparator; and
    when the SR drain voltage coupled to the first input exceeds the voltage coupled to the second input by a predetermined amount for a predetermined time, outputting a CCM ZCD signal, which causes the SR_FET to turn OFF, eliminating cross-conduction between the PS and the SR_FET when the PSC fly-back converter is operating in CCM.

18. The method of claim 17 wherein turning ON the SR_FET comprises turning ON the SR_FET by applying a gate voltage to a gate of the SR_FET through a first P-type field effect transistor (PFET) to turn ON the SR_FET, followed by applying the gate voltage to the gate through a second PFET coupled in parallel with the first PFET to the gate of the SR_FET to maintain the SR_FET ON.

19. The method of claim 17 wherein comparing the sensed SR drain voltage to a voltage coupled to a second input of the CCM ZCD comparator comprises comparing the sensed SR drain voltage to a reference voltage coupled to the second input of the CCM ZCD comparator.

20. The method of claim 17 wherein comparing the sensed SR drain voltage to a voltage coupled to a second input of the CCM ZCD comparator comprises comparing the sensed SR drain voltage to a voltage coupled to the second input of the CCM ZCD comparator through a voltage divider including an external resistor coupled to the drain of the SR_FET and an internal resistor couple between the external resistor and ground.

* * * * *